United States Patent
Smith et al.

(10) Patent No.: US 7,568,130 B2
(45) Date of Patent: Jul. 28, 2009

(54) AUTOMATED HARDWARE PARITY AND PARITY ERROR GENERATION TECHNIQUE FOR HIGH AVAILABILITY INTEGRATED CIRCUITS

(75) Inventors: Jane L. Smith, Akron, OH (US); Douglas Paul Kirchenbauer, Richfield, OH (US); Robert A. Muller, Brunswick, OH (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 11/405,739

(22) Filed: Apr. 18, 2006

(65) Prior Publication Data

US 2007/0260934 A1 Nov. 8, 2007

(51) Int. Cl.
*G06F 11/00* (2006.01)
(52) U.S. Cl. .................................. 714/42; 714/766
(58) Field of Classification Search .............. 714/42, 714/766
See application file for complete search history.

(56) References Cited

U.S. PATENT DOCUMENTS

| | | | | |
|---|---|---|---|---|
| 3,781,797 A * | 12/1973 | Jinbo | ................. | 714/820 |
| 3,863,217 A * | 1/1975 | Taylor | ................. | 714/805 |
| 4,799,052 A * | 1/1989 | Near et al. | ............... | 370/451 |
| 5,515,381 A * | 5/1996 | Chan | ................. | 714/758 |
| 5,664,168 A * | 9/1997 | Yishay et al. | ............. | 713/600 |
| 6,934,888 B2 * | 8/2005 | McIntosh et al. | ............ | 714/43 |
| 2002/0077782 A1* | 6/2002 | Fruehling et al. | ........... | 702/185 |
| 2002/0095634 A1* | 7/2002 | Bhasin et al. | .............. | 714/736 |
| 2006/0253749 A1* | 11/2006 | Alderegula et al. | ........ | 714/718 |
| 2007/0061693 A1* | 3/2007 | Wickeraad | ................. | 714/801 |

OTHER PUBLICATIONS

Gary Burke, et al., Fault Tolerant State Machines, Jet Propulsion Laboratory, California Institute of Technology, 0160/MALPD 2004, pp. 1-10.
PCT International Search Report, International Application No. PCT/US07/66032, Sep. 19, 2008.

* cited by examiner

*Primary Examiner*—Scott T Baderman
*Assistant Examiner*—Paul F. Contino
(74) *Attorney, Agent, or Firm*—Tucker Ellis & West LLP

(57) ABSTRACT

A technique wherein High Availability (HA) hardware is used to automatically validate control and configuration registers, e.g. automatically generate parity, detect parity errors, and report errors within software-written configuration and control registers of ASIC and IC products. Parity control logic and Masking Registers are utilized to facilitate automatic parity generation and subsequent parity error reporting. The specific location of where the error occurred can be stored to enable software to correct and/or reconfigure the registers. The HA hardware verifies the validity of control and configuration registers coupled to a bus, utilizing idle cycles in addition to valid bus cycles so there is no impact on system throughput.

25 Claims, 4 Drawing Sheets

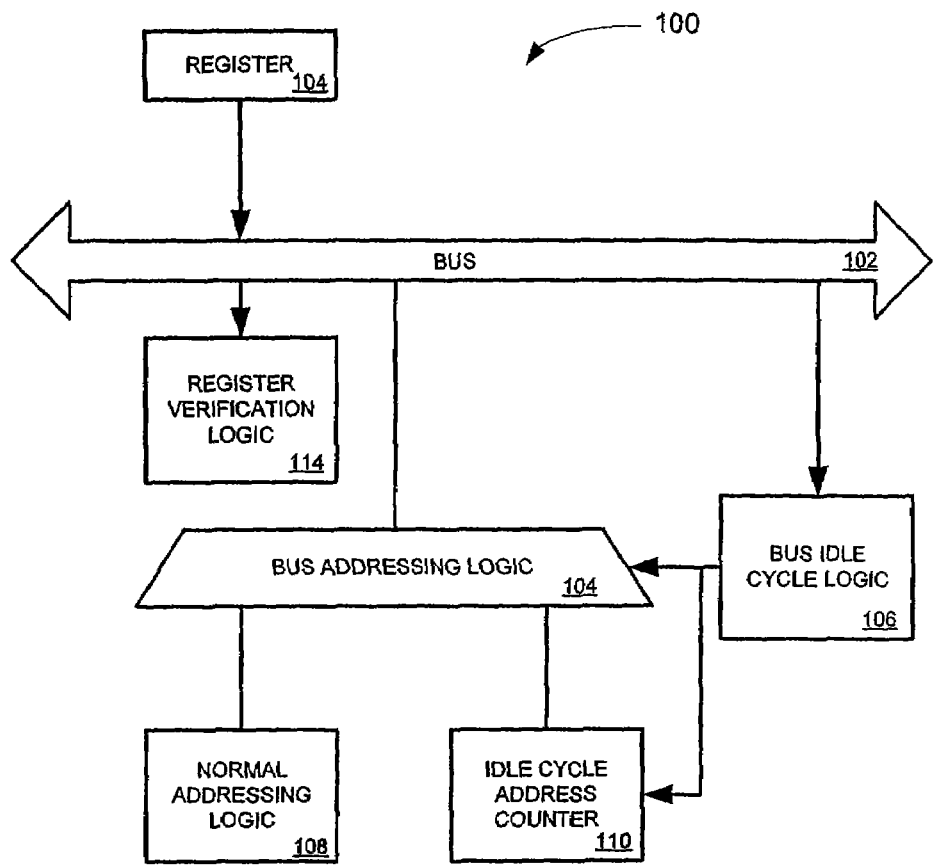
FIGURE 1
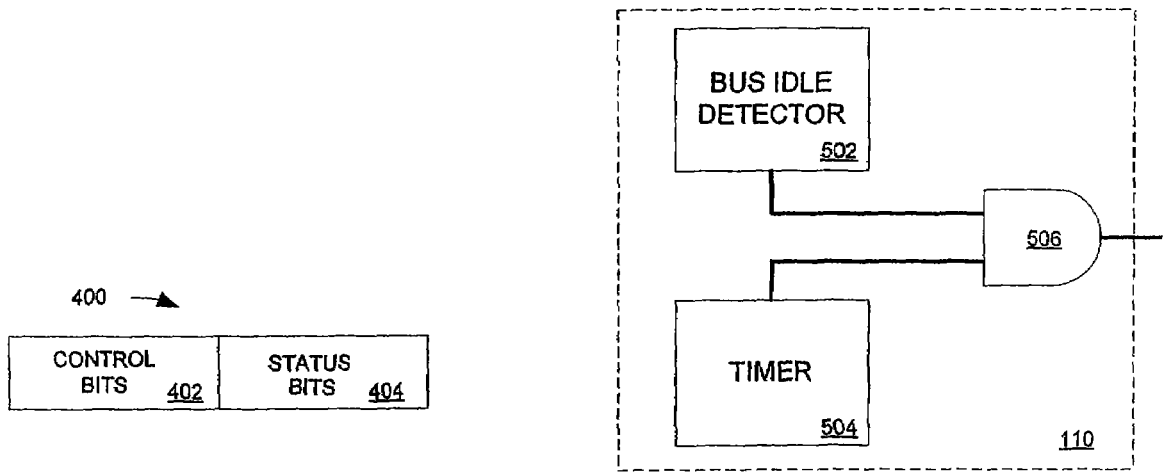
FIGURE 4
FIGURE 5

AUTOMATED HARDWARE PARITY AND PARITY ERROR GENERATION TECHNIQUE FOR HIGH AVAILABILITY INTEGRATED CIRCUITS

BACKGROUND OF THE INVENTION

The present invention relates generally to integrated circuits (ICs), such as Application Specific Integrated Circuits (ASICs), and more specifically to a High Availability (HA) enhancement of ASICs/ICs with control and/or configuration registers that are susceptible to random errors through the introduction of Masking Registers and background parity control logic.

Application Specific Integrated Circuits (ASICs) and Integrated Circuit (ICs) are susceptible to random errors that cause flip-flops to change state incorrectly. Random errors are temporary errors; they are errors that are eradicated when the IC is reset or when the effected register is written. They can occur, for instance, when the logical state of a transistor is changed when an IC is struck by alpha and other sub-atomic particles which can create an ion-induced logical state of a transistor. Random errors can be harmful to a system—particularly if they are in sensitive areas of the ASIC/IC where these types of errors could cause total system failure. A couple of these sensitive areas include Control flip-flops and Configuration flip-flops. These control and configuration flip-flops become even more susceptible to these types of errors as IC technology advances and the transistors geometries decrease.

State machines are a big concern for random errors since they can cause lock-ups or incorrect behavior where recovery can be difficult. Single bit detection or correction can be achieved through proper state encoding. The recommended HA improvement is to add a parity bit to create a Hamming 2 encoding and then generate an error on bad parity and any other unused state. On highly critical state machines, Hamming 3 encoding can be used to correct single bit errors.

Another area of concern is configuration and control flip-flops (bits) which tend to be written at power-up and then are not addressed for long periods of time during normal operation. Failures on single bits in these configuration and control flip-flops can result in subtle problems or totally bring a system down thus resulting in lower system availability. It is very unlikely that software would ever read the control registers once they are written; because software usually only reads locations that are updated by the ASIC circuitry.

Various techniques and/or algorithms are available and open to the public which can be used for detecting or correcting errors. However, there is no set technique established on how these algorithms are implemented. Some methods involve heavy usage of hardware in the form of parity checkers. Others tie up software resources by actively verifying register contents, which can become a problem if a heavily utilized system does not allow time for such checks.

BRIEF SUMMARY OF THE INVENTION

In accordance with an aspect of the present invention, there is disclosed herein a method that is efficient, in regards to both hardware and system resources, automatic, and provides a method for tracking errors that occur. In accordance with an aspect of the present invention there is disclosed herein High Availability (HA) hardware that is used to automatically generate parity, detect parity errors in a timely manner, and report errors within software-written configuration and control registers of ASIC and IC products. Parity control logic and Masking Registers are utilized to facilitate automatic parity generation and subsequent parity error reporting. The specific location of where the error occurred can be stored to enable software to correct and/or reconfigure the registers.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware.

In accordance with an aspect of the present invention, there is disclosed herein an apparatus comprising a bus, a register coupled to the bus having an associated address, and bus addressing logic coupled to the bus. The apparatus further comprises bus idle logic coupled to the bus for determining whether the bus is idle and coupled to the bus addressing logic. The bus addressing logic is responsive to the bus idle logic determining the bus is idle to select the address associated with the register and the register verification logic and to employ register verification logic to verify the contents of the register. In a preferred embodiment the bus verification logic verifies the contents of the register have correct parity (even or odd). In a preferred embodiment, masking registers can be employed to select bits within the register to be verified.

In accordance with an aspect of the present invention, there is disclosed herein a system for high availability. The system comprises a bus, storage means having a corresponding address on the bus, means for selecting an address on the bus, means for verifying the contents of a register and means for determining whether the bus is idle. The means for selecting an address is responsive to the means for determining whether the bus is idle to select the address for the storage means and the means for verifying the contents of the register verifies the contents of the storage means.

In accordance with an aspect of the present invention, there is disclosed herein a method comprising a way for determining when a bus is idle and verifying contents of a register coupled to the bus responsive to the bus being idle. Optionally, the method verifies the contents of the register by verifying parity of the register.

A benefit of the present invention is that it does not use CPU (central processing unit) resources and or the use of valid bus cycles. Although it is possible to check for random errors through software, checking with software typically would require the system to continuously read each address on the bus. Moreover, checking via software uses CPU resources and requires valid bus cycles. In addition, this method allows for automatic parity generation and parity error reporting for control/configuration registers where not all bits within the control/configuration registers are utilized, i.e., no forethought is required for programming the IC in regards to how parity checking will be performed in software. Furthermore, an aspect of the present invention takes advantage of the periods when the bus is inactive, thus it allows for error detection without taking up any CPU time.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

FIG. 1 is a block diagram of a High Availability module in accordance with an aspect of the present invention.

FIG. 4 is a block diagram of a configuration register.

FIG. 5 is a block diagram of bus idle logic in accordance with an aspect of the present invention.

DETAILED DESCRIPTION OF INVENTION

Figure 2:
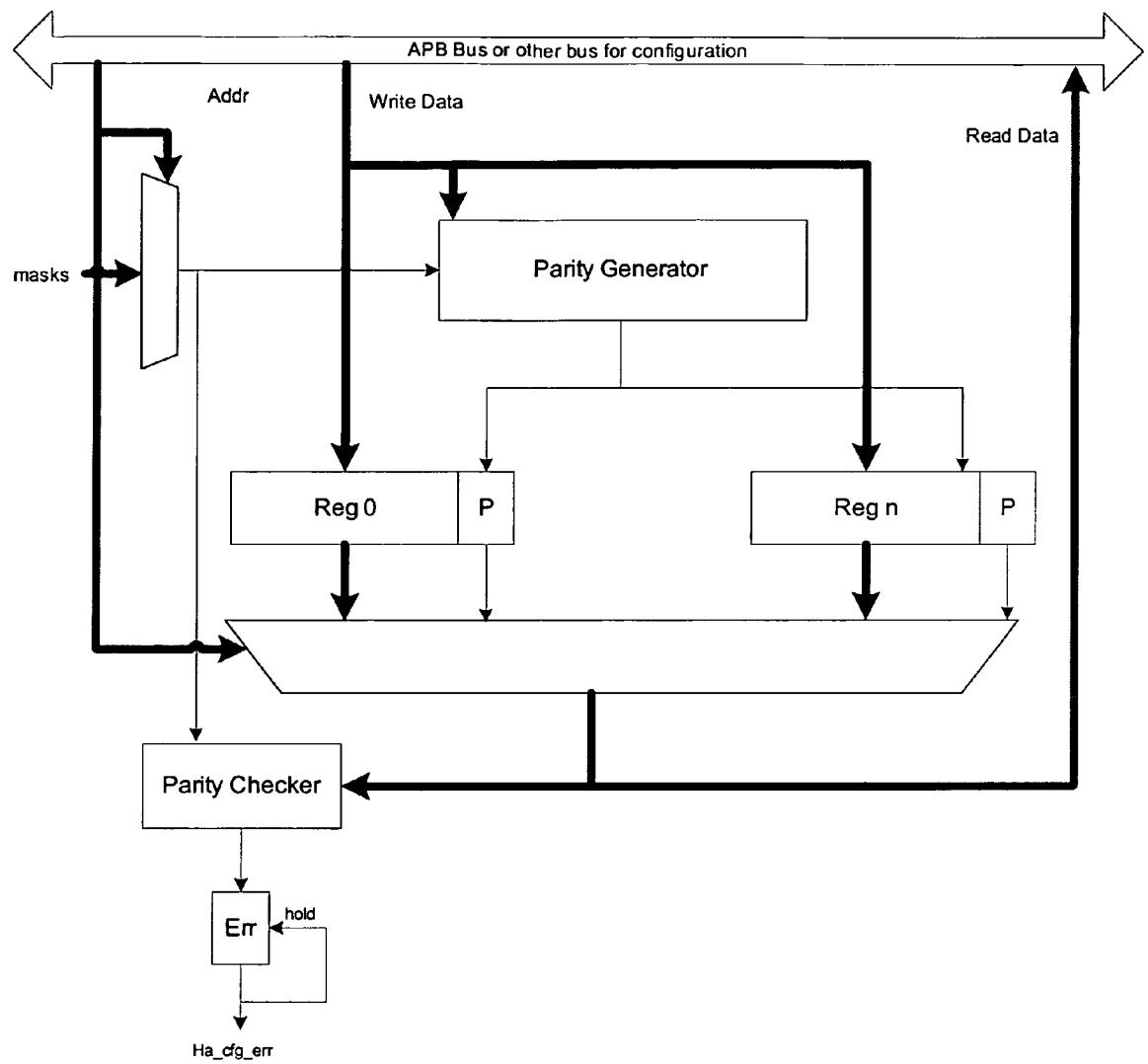
FIG. 2 is a block diagram of logic for detecting random errors.

Throughout this description, the preferred embodiment and examples shown should be considered as exemplars, rather than limitations, of the present invention. An aspect of the present invention contemplates High Availability (HA) hardware that is used to automatically generate parity, detect parity errors, and report errors within software-written configuration and control registers of ASIC and IC products. Parity control logic and Masking Registers can be used to help facilitate automatic parity generation and subsequent parity error reporting. The specific location of where the error occurred can be stored to enable software to correct/reconfigure the registers.

The invention comprises a bus, such as the AMBA (Advanced Microcontroller Bus Architecture) APB (Advanced Peripheral Bus) or AHB (Advanced High-performance Bus). Other types of bus architectures may also be used. All modules within the design that have configuration/control registers are controlled via the bus (for whichever bus system or bus systems are used within the system).

An aspect of the present invention entails checking for parity errors in each software written register (e.g. control/configuration register) within each module of a design. In a preferred embodiment, an additional parity bit is added to the end of each register. Also, a parity error signal is added to each module located on the bus. After a reset, each register initiates to a known state and a valid parity bit for the register is saved. In addition, any time a register is written (i.e. when the write-enable and the module select lines are asserted) the parity of the register being written is updated.

An aspect of the present invention employs Masking Registers in ASIC designs to help facilitate automatic parity creation and parity checking. The Masking Registers are used to specify which bits of a particular configuration/control register are exclusive software controlled in a design. The Masking Register's length needs to match the number of bits of the bus used for the write. There is one Masking Register per each control/configuration register. The value of the Masking Register is hard-coded in the Register Transfer Logic (RTL) and is determined by which bits are Read/Write or are exclusively software controlled by the corresponding control/configuration register. For each bit that is exclusively software controlled inside the control/configuration register, a "1" is placed in the corresponding bit of the assigned Masking constant. A "1" indicates that the corresponding bit is "turned on."

For example, bits unused for parity generation can be read only bits not under the control of software, unimplemented bits, bits that are partially under software control, or bits that are partially under hardware control. If parity is based on the value on the bus during a write cycle, the bit may not actually be changed and therefore the parity value would be invalid. Moreover, the bit might change when software writes it, but may be changed later by software, making the parity written invalid.

Each time the system writes a register, the Mask Register is utilized to "mask" out the bits that are not under exclusive software control for parity generation. In essence, each bit of the Masking Register that contains a "1" enables the corresponding data bus bits to be used in the generation of the parity bit. For example, if only bits 0 and 1 are software controllable in a control/configuration register, the corresponding bits within the Masking Register would be set to "1" while the rest of the bits in the Masking register are set to "0's". The Masking Register bits 0 and 1 then enable the data bus values for segments 0 and 1 to pass through for parity calculation. Once the parity value is created, the parity value is stored in a flip-flop (parity bit) that is appended to the corresponding control/configuration register i.e. one bit is added to each register to store the parity value.

The parity of the addressed data is constantly verified in every module attached to the bus. This "global" verification continuously takes place when the bus is busy and when the bus becomes inactive (in regards to normal system operation). If a parity error is detected, an error signal is asserted and the location of where the error occurred is stored in a HA or similar type of module.

An aspect of the present invention is that the HA module verifies the contents of the registers while the bus is idle. While the bus is inactive, the HA module cycles through the entire address space of the bus via an Address Counter (Note: The HA module contains a counter large enough to cycle through the entire address space of the system via an Address Counter. It also contains control circuitry to switch the address between normal bus activity and the address provided by this internal HA Address Counter.). The internal circuitry of the HA module places the Address Counter value on the address bus which is presented to all of the modules on the bus. The counter value cycles through the known address space at that time. When an error occurs, the location of where the error occurred is stored. Software or other hardware can be created to correct/reconfigure the register where the parity error occurred.

When the bus is active, the HA suspends its internal Address Counter, and the system performs its bus operations as normal. During these "normal" bus operations, each module still checks the parity of registers within each respective module that the address on the bus pertains to (each module can potentially use the same address sub-space; however, a module acknowledges system requests only if the module's select line is asserted). In essence, during times of bus activity, the registers of all modules on the bus are systematically checked for random errors, and the registers that are checked are determined by the current sub-address being accessed by the system. All modules perform parity checks on internal control/configuration registers using the address on the bus (regardless of whether the individual module is selected or not).

An aspect of the present invention is that it takes advantage of times when a bus in an ASIC or IC is inactive to systematically detect random errors that occur in control and configuration registers. In addition, registers in multiple modules are checked simultaneously during times when the bus is active or inactive. This simultaneous error checking reduces the amount of bandwidth needed to perform error checking tasks and it also decreases the time required to discover a random error since error checking is performed in parallel as opposed to in serial.

Aspects of the present invention can be easily implemented into all designs that use control/configuration registers (which includes virtually all ASIC/IC designs). It becomes more important if the control/configuration registers are written once upon boot-up and not "refreshed" anytime thereafter (systematic control/configuration refreshing is not normally performed, so the errors are not likely to be eliminated—even inadvertently). Furthermore, a method for this type of random error checking has become increasingly important as advancing technology has driven the size of transistors to smaller geometries thus making them more susceptible to random errors. Furthermore, aspects of the present invention can be extended to include RAMS within a design. In addition, the errors, along with their respective addresses, can be cued-up (into FIFO's) if necessary.

FIG. 1 is a block diagram of a High Availability Integrated Circuit 100 in accordance with an aspect of the present invention. HA IC 100 comprises a bus 102. Register (e.g. a control/configuration register) 104 is coupled to bus 102. Register 104 has an address that enables bus 102 to select the register for reading and/or writing.

Bus addressing logic 104 is employed to select addresses on bus 102. As illustrated in FIG. 1, bus addressing logic 104 is a controllable switching device (e.g. a multiplexer) with two inputs. The first input is coupled to normal addressing logic 108 used to select addresses when the bus is active. The second input is coupled to Bus Idle Address Counter 110, which as will be explained herein cycles through addresses on bus 102 to test control/configuration registers.

Bus idle logic 106 determines when bus 102 is idle. Bus idle logic 106 is coupled to bus addressing logic 104 and selects which input, normal addressing logic 108 or bus idle address counter 110 is used to select an address on bus 102. When bus 102 is idle, bus idle logic 106 controls bus addressing logic 104 to select bus idle address counter 110. When bus 102 is active, bus idle logic 106 controls bus addressing logic 104 to select normal addressing logic 108.

Register verification logic 114 validates the contents of the register (e.g. register 104) on bus 102. In a preferred embodiment, register validation logic 114 verifies the contents of the register by determining the parity of the register. For example, register validation logic 114 can determine whether the parity is even or odd and determines the appropriate parity for the register and whether the parity of the register matches the appropriate parity for the register.

In accordance with an aspect of the present invention, as will be described further in FIGS. 2 and 3, a masking register can be used for selecting bits of register 104 to verify. For example, the parity of the selected (e.g. masked) bits of register 104 can be validated by register verification logic 114.

Masking may be employed for various reasons. For example, some or all bits in any address location may not be implemented. Some or all bits at an address location may be read-only. Furthermore, some or all bits in any address location may be customized where they are written by software but may also be written by other ASIC circuitry.

The bits just mentioned above (e.g. read only bits or bits that may be written by hardware) should not be included in the generation of parity. A mask will be generated for each register that indicates which bits are strictly R/W by software. These are the bits protected by parity generation/checking. These masks are constants in the RTL, and are selected at the time of the write by using the write address to select the appropriate constant.

The selected mask is logically AND'd with the write data bus as part of the parity generator logic. Then the parity is written to the addressed register when the rest of the data is written. Each register is written in a normal APB cycle or other type of bus cycle along with its generated parity bit.

The bits that are covered by parity generation/checking are reset to a known state at power up and a valid parity bit is generated by a reset. This will be done with an asynchronous reset. Constants in the RTL will be provided for each register giving the reset value to use and the initial parity bit, resulting in valid parity.

For example, referring to FIG. 4 with continued reference to FIG. 1, there is illustrated a control/configuration register 400. The register comprises control bits 402 and status bits 404. Because status bits in 404, in this example, may be changed/altered by processes outside of software control, in a preferred embodiment bits 404 are not verified. The register 400 would be masked so that only control bits 402 are used for generating parity.

As described herein a single register 104 is coupled to bus 102, however this is merely for ease of illustration as those skilled in the art can readily appreciate that a plurality of registers can be coupled to bus 102. Each of the plurality of registers is individually addressable so that register verification logic 114 can verify the contents of all the control/configuration registers while bus 102 is inactive.

In accordance with an aspect of the present invention, if bus idle logic 106 detects bus 102 is active while verification is occurring, bus addressing logic 104 switches to normal processing logic 108 and bus idle address counter 110 suspends operation. Subsequently, after bus idle logic 106 determines that bus 102 is idle again, bus idle logic 106 switches bus addressing logic 104 to select bus idle address counter 110 and bus idle address counter 110 resumes cycling through addresses.

In accordance with an aspect of the present invention, as will be described in further detail in FIG. 3, if register validation logic 114 detects an error, an error code can be written into a status register. Optionally, or alternatively, the address of the register that produced the error can be written into the status register. An interrupt can be generated to take corrective action for the error. Such corrective action can include, but is not limited to, re-booting system 100 or re-initializing the register.

In accordance with an aspect of the present invention, a programmable timer can be employed to limit testing to a pre-defined interval. This can be useful to save power and allow system 100 to employ a power save state. For example, the timer can be set so that testing occurs during any desired interval, e.g., once a day, every hour, every 10 minutes, etc. Referring to FIG. 5, with continued reference to FIG. 1, there is illustrated a detailed exemplary logical diagram for bus idle logic 112 employing a timer. Bus idle detection logic 502 determines when bus 102 is idle. Timer 504 is set to a desired testing interval. The outputs of bus idle detector 502 and timer 504 are logically AND'd at AND gate 506. Thus, if timer 504 hasn't expired, signals from bus idle detector 502 can be blocked, preventing bus idle logic 106 from switching bus addressing logic 104 to bus idle address counter 110 and can also be used to suspend the operation of bus idle address counter 110.

Alternatively, a timer can be used to slow down the cycling speed of the idle cycle address counter 110. In this method, the address is held for a programmable number of idle cycles, before it cycles to the next address. This also provides for power savings.

FIG. 2 is a block diagram of the logic 200 for detecting random errors in registers. An aspect of FIG. 2 is that the parity checking logic minimizes the amount of parity checking hardware yet can verify parity for each register in a "reasonable" amount of time.

For example, for an APB bus, since there is a built-in multiplexer for APB reads, it can be used to select the register for parity checking. Therefore, only one parity checking circuit is required per local configuration block. The lower bits of the APB address always select the register checked for parity, regardless of any other activity on the APB bus. In other words, parity will be checked on the addressed register even when no APB cycle is occurring (e.g. the bus is idle). Since the upper bits of address are ignored when checking parity, the multiplexed value is always checked. If the address is not used, a default good parity constant is read in (e.g., the block implements addresses 0-6, so address 7 will not be used). When the APB is not in use, the address is driven by a counter (e.g. bus idle address counter 110 in FIG. 1) which cycles through the entire address space. This feature allows parity checks without software intervention.

The masks used for selecting the bits covered by the parity bit are used to select the bits for parity checking in the parity checker block. Since valid (e.g. even or odd) parity must be generated by power-on-reset and by any writes, parity should be valid at all times so parity can be checked every cycle.

In FIG. 2, when data is read from bus 102, mask register module 202 contains registers that are used to determine which bits to mask. During a read cycle, the bits to be masked are passed from mask logic 202 to parity checker 204, which also receives the data read from multiplexor 210. Parity checker 204 would be embodied in register verification logic 114 (FIG. 1). If parity checker 204 detects an error, then an error register (e.g. a flip flop) 206 is set. The status of error register 206 is maintained until it is reset either by software or hardware.

When data is written to registers (Reg. 0 . . . Reg. n) 104, the write data is passed from bus 102 to parity generator 208. Parity generator 208 also receives the appropriate mask from mask register module 202 for generating parity. The data and parity bit are then sent from parity generator 208 to Registers 104.

Figure 3:
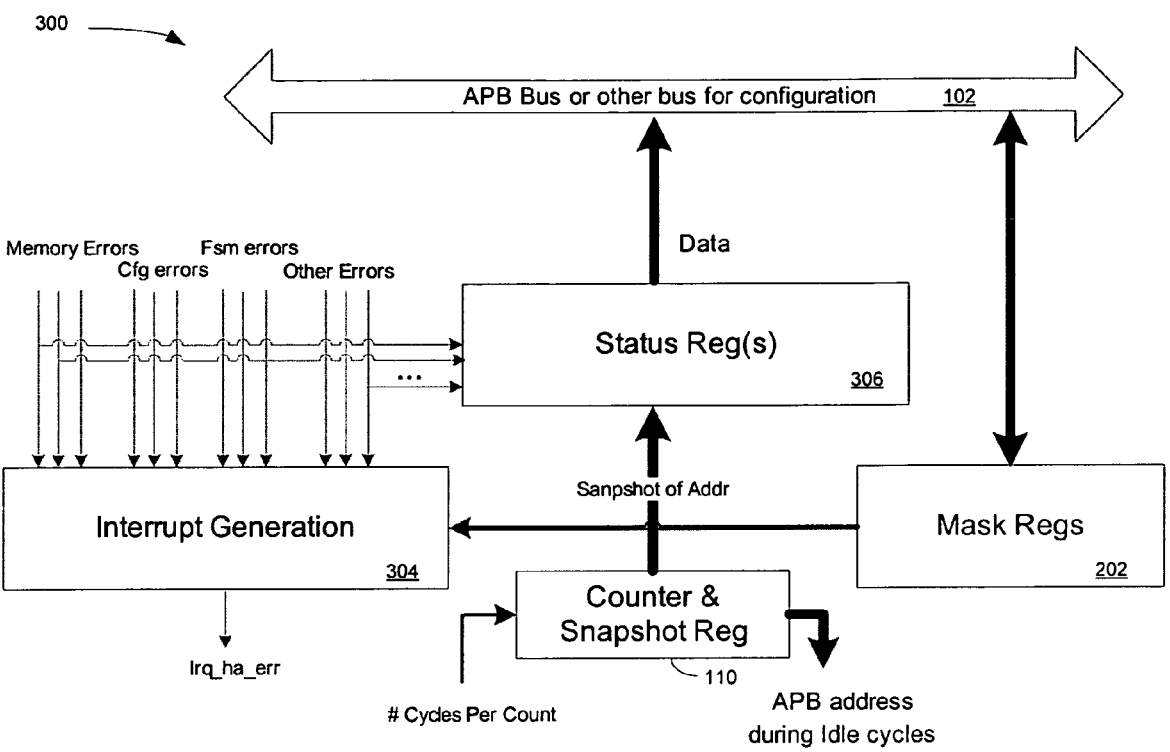
FIG. 3 is a block diagram of logic for reporting errors.

FIG. 3 is a block diagram of a circuit 300 for reporting errors. A goal of error reporting is to generate an interrupt so software will take corrective action (e.g., reset the hardware) as needed. FIG. 3 shows the top-level HA circuitry 300. All of the error types are logically OR'd to produce a single interrupt, which is generated by interrupt generation logic 304, but each type of error is maskable, providing total flexibility to software. Each individual error is held in a readable status register 306. Also, the address of the counter 110 used for background bus address generation is provided as status. A snapshot of the address is held when an error occurs until it is handled by software. This allows software the ability to determine the origin of the HA error. Any statistics on HA errors can be maintained by software since SBE errors should be very infrequent and it is expected that power cycles could occur more frequently than SBE errors, clearing any statistics maintained in the hardware (e.g., status register 306).

Figure 6:
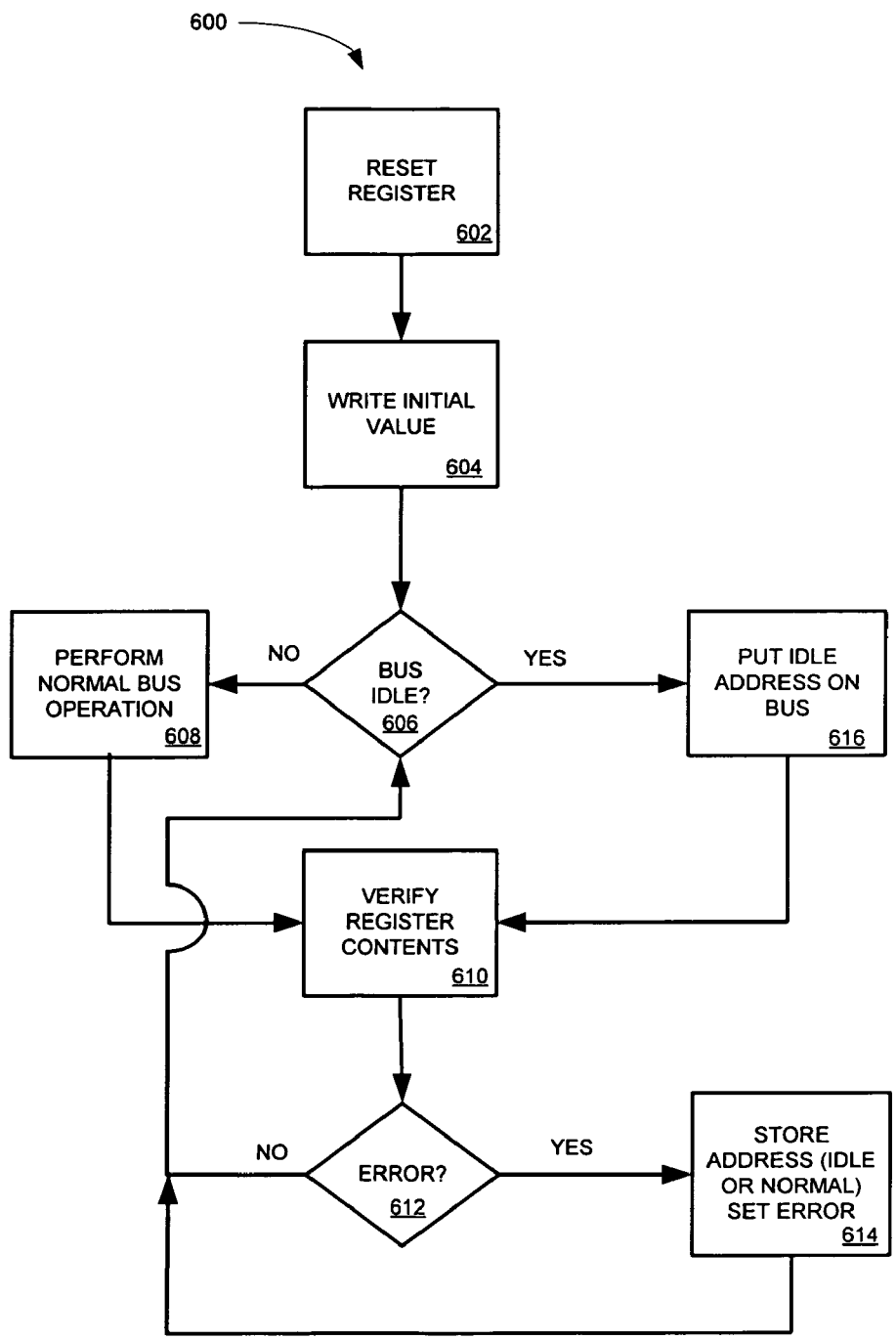
FIG. 6 is a block diagram of a methodology in accordance with an aspect of the present invention.

In view of the foregoing structural and functional features described above, a methodology in accordance with various aspects of the present invention will be better appreciated with reference to FIG. 6. While for purposes of simplicity of explanation the methodology of FIG. 6 is shown and described as executing serially, however, it is to be understood and appreciated that the present invention is not limited by the illustrated order as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 6 is a block diagram of a methodology 600 in accordance with an aspect of the present invention. As illustrated, methodology 600 provides the steps taken in a preferred embodiment from the HA IC is booted up or reset. At 602, when the IC is first booted up or reset, the register is reset to a known value. For registers with a parity bit, the parity bit is set to the appropriate value.

At 604, typically as the system is initializing, an initial value is written into the register. If the register has a parity bit, the parity bit is set to the appropriate value for the contents written into the register. If any bits are masked, they are accounted for when the parity bit is written.

At 606, it is determined whether the bus is idle. If the bus is not idle, e.g. active, (NO), at 610 normal bus operations are performed as shown at 608. During the normal bus operation, the parity of the register is verified, at 610. At 612 it is determined whether an error was detected. In a preferred embodiment, if an error was detected at 612 (YES), at 614 an error condition is set and the address causing the error is stored. After normal bus operations/verifications are completed, step 606 is repeated.

If at 606, it is determined that the bus is idle (YES), at 610 the register contents of the idle address are verified. At 616 the idle address is put on the bus and at 610 the contents of the register are verified. In a preferred embodiment, the contents of the register are verified by determining the parity of the register. The parity of the register is compared with the appropriate parity of the register (even/odd). This verification step is done regardless of the type of cycle.

Optionally, a masking register can be used for selecting bits of the bits of register to verify. Masking may be employed for various reasons. For example, some or all bits in any addresses location may not be implemented. Some or all bits at an addressed location may be read-only. Furthermore, some or all bits in any addressed location may be customized where they are written by software but may also be written by other ASIC circuitry.

The bits just mentioned above should not be included in the generation of parity. A mask will be generated for each register that indicates which bits are strictly R/W by software (excludes above bits). These are the bits protected by parity generation/checking. These masks are constants in the RTL, and are selected at the time of the write by using the write address to select the appropriate constant. The selected mask is logically AND'd with the write data bus as part of the parity generator logic. Then the parity is written to the addressed register when the rest of the data is written. Each register is written in a normal APB cycle along with its generated parity bit.

In accordance with an aspect of the present invention, if there are a plurality of registers to be verified, an address counter cycles through all the addresses of the registers to verify the contents of all of the registers while the bus is inactive. However, if the bus again becomes active, verifying the contents of the register at 610 can still be performed.

When normal bus operations at 608 are completed, verifying the register contents at 610 can be resumed. The checks performed at 616 are systematic and thus guarantee all registers get checked, checking can still be completed during a normal cycle.

In accordance with an aspect of the present invention, a plurality of registers can be verified in parallel. For example, if there are multiple configuration blocks, and not all 32 bits are used for address (a typical embodiment, where fewer bits of address are decoded at the register level and a select is provided), the addressed location in each of the blocks will be verified in parallel. In addition, during an active bus cycle, the addressed location is verified in all blocks but the operation occurs only in the block with the active select. The parallel verification of multiple registers occurs when there are multiple system 100s in a given ASIC, that is the configuration is distributed.

If at 612, it is determined whether an error was discovered at 610. If no error was found at 610 (NO), then the process repeats at 606 for the next cycle. If an error was detected at 612 (YES), then at 614 corrective action is taken. There are several options available for corrective action. In a preferred embodiment, an error code can be written into a status register. Optionally, or alternatively, the address of the register that produced the error is also written into the status register or could be saved in the idle address counter register. An interrupt can be generated to take corrective action for the error. Such corrective action can include, but is not limited to, re-booting system 100, re-initializing the register.

After the corrective action is taken at 614, the system can either be reset and processing starts at 602, or if the error can be corrected without re-booting, or is not deemed serious enough to require a re-boot, then processing can return to 606.

In a preferred embodiment, methodology 600 verifies a plurality of registers. Steps 606, 610 and 612 (and if necessary 614) repeat for each address until all of the registers have been tested. If the bus becomes active while the testing is occurring, at 606 the verification process at 610 would continue during the normal bus operation, but the idle address would not increment.

In accordance with an aspect of the present invention, testing can be performed after a predetermined interval has elapsed. This can be useful to save power and to allow a system to employ a power save state. The predetermined interval any desired interval, e.g., once a day, every hour, every 10 minutes, etc. Thus, if the predetermined interval has not yet elapsed, then at 606 normal bus operations (at 608) occur but verifying register contents (at 610) is suspended. However, after the elapsed time has passed, then when the bus is idle at 606, the idle register address is used for verification at 610.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
    a bus;
    a register coupled to the bus having an associated address;
    register verification logic coupled to the bus;
    bus addressing logic coupled to the bus;
    bus idle logic coupled to the bus for determining whether the bus is idle and coupled to the bus addressing logic;
    a timer coupled to the bus idle logic;
    wherein the bus addressing logic is responsive to the bus idle logic determining the bus is idle to select the address associated with the register and the register verification logic is responsive to verify the contents of the register; and,
    wherein the timer is coupled to the bus idle logic to limit the verifying of the contents of the register in accordance with a pre-defined interval set in the timer.

2. An apparatus according to claim 1, wherein the bus verification logic verifies the contents of the register has correct parity.

3. An apparatus according to claim 1, further comprising a masking register for selecting bits of the register to verify, wherein the bus verification logic verifies the selected bits of the register has correct parity.

4. An apparatus according to claim 1,
    wherein the register further comprising a plurality of registers having an associated plurality of register addresses;
    wherein the bus addressing logic is responsive to the bus idle logic to determining the bus is idle to cycle through the associated plurality of addresses; and
    wherein the register verification logic is responsive to verify the contents of the registers of the associated plurality of addresses.

5. An apparatus according to claim 4, wherein the bus addressing logic is responsive to suspend cycling through the associated plurality of addresses responsive to determining the bus is active.

6. An apparatus according to claim 5, wherein the bus addressing logic is responsive to resume cycling through the associated plurality of address responsive to determining the bus is idle.

7. An apparatus according to claim 4, further comprising a status register, wherein the register verification logic is responsive to determining the contents of the register are not valid to write an error code into the status register.

8. An apparatus according to claim 7, wherein the register verification logic, responsive to determining the contents of the register are not valid, writes an address indicative of a register where contents were detected that were not valid.

9. An apparatus according to claim 7, further comprising an interrupt generating circuit, wherein the interrupt generating circuit is responsive to generate an interrupt responsive to the register verification logic determining the contents of the register are not valid.

10. An apparatus according to claim 1, wherein the register is one of the group consisting of a configuration register and a control register.

11. An apparatus according to claim 1, the bus addressing logic further comprises:
    a controllable switching device having first and second inputs and operable to switch one of the first input and the second input;
    a first addressing logic for specifying addresses in a normal mode coupled to the first input of the controllable switching device;
    a second addressing logic for specifying addresses in an idle mode coupled to the second input of the controllable switching device;
    wherein the controllable switching device is responsive to the bus idle logic to switch to the second input responsive to the bus idle logic detecting the bus is idle and to switch to the first input to the output responsive to the bus idle logic determining the bus is active.

12. An apparatus according to claim 11, further comprising:
the register further comprising a plurality of registers having an associated plurality of register addresses;
the second addressing logic further comprising a sequence counter;
wherein the second addressing logic is responsive to sequence counter to cycle through the associated plurality of addresses; and
wherein the register verification logic is responsive to verify the contents of the registers of the associated plurality of addresses.

13. An apparatus according to claim 1, further comprising a timer, wherein the bus idle logic is responsive to the timer to determining whether the bus is inactive after the timer expires.

14. An apparatus according to claim 1, further comprising:
an idle cycle address counter; and
wherein the timer is operative to slow down a cycling speed of the idle cycle address counter.

15. A system for high availability, comprising:
a bus;
storage means having a corresponding address on the bus;
means for selecting an address on the bus;
means for verifying the contents of a register coupled to the bus;
means for determining whether the bus is idle;
timing means for limiting verification of the contents of the register to a predetermined time interval;
wherein the means for selecting an address is responsive to the means for determining whether the bus is idle to select the address for the storage means; and
wherein the means for verifying the contents of the register verifies the contents of the storage means.

16. An apparatus according to claim 15, wherein for verifying the contents of a register verifies the register has correct parity.

17. An apparatus according to claim 15, further comprising a means for masking bits of the storage means, wherein he means for verifying the contents of the storage means verifies selected bits of the storage means has correct parity.

18. An apparatus according to claim 15,
wherein the storage means further comprises a plurality of storage means having an associated plurality of storage means addresses;
wherein the means for selecting an address on the bus is responsive to the means for determining whether the bus is idle to cycle through the associated plurality of storage means addresses; and
wherein the means for verifying the contents of a register is responsive to verify the contents of the storage means at the associated plurality of storage means addresses.

19. An apparatus according to claim 15, the means for selecting an address on the bus further comprises:
means for switching between a first input and a second input;
means for addressing in a normal mode coupled to the first input of the means for switching;
means for selecting storage means addresses coupled to the second input of the means for switching;
wherein the means for switching is responsive to the means for determining whether the bus is idle to switch to the second input responsive to the means for determining whether the bus is idle detecting the bus is idle and to switch to the first input responsive to the means for determining whether the bus is idle determining the bus is active.

20. An apparatus according to claim 19, the means for selecting storage means addresses further comprises means for cycling through the storage means addresses.

21. A method for verifying contents of a register coupled to a bus, comprising:
determining whether the bus is idle;
selecting an address on the bus associated with the register responsive to determining the bus is idle;
verifying contents of the register coupled to the bus responsive to the bus being idle; and
limiting verifying contents of the register in accordance with a pre-defined time interval.

22. A method according to claim 21, the verifying register contents further comprises verifying parity of the register.

23. A method according to claim 21, the verifying register contents further comprises masking bit of the register, and verifying parity of the masked bits.

24. A method according to claim 21, wherein the register further comprises a plurality of register, and the verifying register contents further comprises verifying the contents of the plurality of registers.

25. A method according to claim 21, further comprising:
resetting the register.

* * * * *